(12) United States Patent
Thorpe et al.

(10) Patent No.: US 6,999,563 B1
(45) Date of Patent: Feb. 14, 2006

(54) ENHANCED DIRECTORY ASSISTANCE AUTOMATION

(75) Inventors: Michael G. Thorpe, Fairport, NY (US); Robert C. Detrie, Penfield, NY (US); Gregory J. Bielby, Pointe Claire (CA)

(73) Assignee: Volt Delta Resources, LLC, New York, NY (US)

( * ) Notice: Subject to any disclaimer, the term of this patent is extended or adjusted under 35 U.S.C. 154(b) by 852 days.

(21) Appl. No.: 09/642,730

(22) Filed: Aug. 21, 2000

(51) Int. Cl.
*H04M 1/64* (2006.01)
*H04M 3/42* (2006.01)

(52) U.S. Cl. ............... 379/67.1; 379/88.01; 379/88.07; 379/88.17; 379/88.18; 379/201.07; 379/207.12; 379/218.01; 379/218.02; 379/142.07; 379/142.15

(58) Field of Classification Search ............ 379/88.01, 379/88.07, 201.07, 207.12, 218.01, 913, 379/218.02, 142.07, 142.15, 67.1, 88.17, 379/88.18
See application file for complete search history.

(56) References Cited

U.S. PATENT DOCUMENTS

| | | | | |
|---|---|---|---|---|
| 5,163,083 A | * | 11/1992 | Dowden et al. | 379/88.03 |
| 5,479,488 A | | 12/1995 | Lennig et al. | |
| 5,488,652 A | * | 1/1996 | Bielby et al. | 379/88.03 |
| 5,638,425 A | * | 6/1997 | Meador et al. | 379/88.01 |
| 6,208,713 B1 | * | 3/2001 | Rahrer et al. | 379/67.1 |
| 6,404,876 B1 | * | 6/2002 | Smith et al. | 379/218.01 |

* cited by examiner

*Primary Examiner*—Allan Hoosain
(74) *Attorney, Agent, or Firm*—Jenkens & Gilchrist, P.C.

(57) ABSTRACT

The present invention enhances directory assistance automation by searching traditional directory assistance databases with independent listing and locality queries. Initially, a caller's speech responses from a directory assistance inquiry are individually converted to independent listing and locality search queries. The listing and locality queries are determined by processing the caller's speech responses using a defined speech recognition grammar. The listing and locality queries are used to search a directory assistance database. Once the listing results are returned from the directory assistance database, the records in the listing results are analyzed to select a number for the caller's directory assistance request.

33 Claims, 8 Drawing Sheets

INITIAL TELEPHONE NUMBER SEARCH

| NUMS | LOCS | LISTINGS | COMMENT AND RESPONSE |
|---|---|---|---|
| 0 | | | • NUMBER CHANGED AFTER FRL NUMBERS WERE EXTRACTED<br>• SEND CALL TO OPERATOR |
| 1 | | | • IDEAL RESULTS, NO CONFUSION |
| 1 | 1 | MULT | • THE "SAME" BUSINESS CAN BE FOUND MULTIPLE WAYS<br>• OFTEN (BUT NOT ALWAYS) THESE MULTIPLE LISTINGS WILL BE IN A SET<br>• TAILOR THE SUBSEQUENT SEARCHES TO "TARGET" ONE OF THE AVAILABLE LISTINGS TO REDUCE SUBSEQUENT SIFTING<br>• THE CALLER MAY TEND TO "VOLUNTEER" EXTRA IDENTIFYING WORDS, SUCH AS THE STREET, BECAUSE THEY KNOW THAT MULTIPLY LOCATIONS EXIST<br>• CONSIDER A "RICHER" VOCABULARY TO INCREASE THE LIKELIHOOD THAT WE WILL ACCEPT WHAT THE CALLER SAYS |
| 1 | MULT | | • THIS MAY BE A "SPECIAL" LISTINGS, SUCH AS AN AIRLINE RESERVATIONS NUMBER<br>• IF VERY FREQUENTLY REQUESTED, THEN DROP THE LOCALITY FROM THE SEARCH CRITERIA TO IMPROVE THE FINDABILITY |

*FIG. 6*

PRE-RUN-TIME (STATIC) SEARCH

| NUMS | LOCS | LISTINGS | COMMENT AND RESPONSE |
|---|---|---|---|
| | | 0 | ○ NAME RETURNED BY TEL SEARCH NOT SEARCHABLE<br>○ IT MAY HAVE NON-FINDING TEXT IN NAME SUCH AS "IF NO ANSWER"<br>○ EDIT DOWN THE NAME IN ORDER TO SEARCH FOR THE LISTING |
| | | 1 | ○ DO NOT NEED LOCALITY TO FIND THIS LISTING, BUT NOT SURE THAT THIS IS OR IS NOT A SPECIAL WIDELY FINDABLE LISTING |
| | 1 | MULT | ○ THE "SAME" BUSINESS CAN BE FOUND MULTIPLE WAYS<br>○ OFTEN (BUT NOT ALWAYS) THESE MULTIPLE LISTINGS WILL BE IN A SET<br>○ TAILOR THE SUBSEQUENT SEARCHES TO "TARGET" ONE OF THE AVAILABLE LISTINGS TO REDUCE SUBSEQUENT SIFTING<br>○ THE CALLER MAY TEND TO "VOLUNTEER" EXTRA IDENTIFYING WORDS, SUCH AS THE STREET, BECAUSE THEY KNOW THAT MULTIPLY LOCATIONS EXIST<br>○ CONSIDER A "RICHER" VOCABULARY TO INCREASE THE LIKELIHOOD THAT WE WILL ACCEPT WHAT THE CALLER SAYS |
| 1 | | MULT | ○ THIS MAY BE A "SPECIAL" LISTINGS, SUCH AS AN AIRLINE RESERVATIONS NUMBER<br>○ IF VERY FREQUENTLY REQUESTED, THEN DROP THE LOCALITY FROM THE SEARCH CRITERIA TO IMPROVE THE FINDABILITY |
| MULT | 1 | MULT | ○ DIFFERENT NUMBERS IN "SAME" COMMUNITY<br>○ SELECT ONE NUMBER BY FIAT AS THE FRL AND TARGET THE SEARCH TO JUST THE ONE DESIRED LISTING<br>○ INCREASE VOCABULARY IN HOPE THAT CALLER WILL HELP WITH SELECTION |
| | | MULT | ○ DIFFERENT NUMBERS IN MULTIPLE COMMUNITIES<br>○ DEFER PROBLEM TO RUN-TIME IN THE HOPE THAT THE CALLER-SUPPLIED LOCALITY WILL REDUCE THE PROBLEM TO A SIMPLER CASE<br>○ SELECT ONE NUMBER BY FIAT AS THE FRL AND TARGET THE SEARCH TO JUST THE ONE DESIRED LISTING |

*FIG. 7*

RUN-TIME SEARCH ANALYSIS

| NUMS | LOCS | LISTINGS | COMMENT AND RESPONSE |
|---|---|---|---|
| | | 0 | • THIS IS NO-FIND: RUN-TIME LOCALITY DIDN'T MATCH LISTING |
| | | 1 | • IDEAL RESULTS, NO CONFUSION |
| 1 | | MULT | • GOOD RESULTS, BUT NEED TO BE CAREFUL WITH CONFIRMATION<br>• HAVE THE CALLER ACCEPT THE NUMBER WITHOUT CONFUSING THEM WITH VARIATIONS BETWEEN THE EQUIVALENT ALTERNATIVES |
| 1 | | MULT | • GOOD RESULTS, BUT NEED TO BE CAREFUL WITH CONFIRMATION<br>• HAVE THE CALLER ACCEPT THE NUMBER WITHOUT CONFUSING THEM WITH VARIATIONS BETWEEN THE EQUIVALENT ALTERNATIVES |
| MULT | 1 | MULT | • PROBLEM: NEED TO SIFT |
| | | MULT | • PROBLEM: NEED TO SIFT |

ENHANCED DIRECTORY ASSISTANCE AUTOMATION

FIELD OF THE INVENTION

The present invention relates generally to directory assistance automation, and in particular, to enhancing directory assistance automation by allowing more efficient automation for a greater number of listings.

BACKGROUND OF THE INVENTION

Directory assistance has been necessary since the onset of the public switched telephone system. In the beginning, operators would manually find listings according to caller requests. As the telephone networks grew, increased demand for directory assistance followed, and automation became necessary to control the costs associated with providing listing information to callers. Modern directory assistance automation has continued to progress from this archaic system throughout the years.

A major development was the advent of special switches to connect directory assistance calls to dedicated operators. The switches are referred to as Toll Operator Position Switches (TOPS). During a directory request, callers are connected to an operator having access to a database of listings. The operator asks the caller for the requested listing and locality and queries the database for the appropriate number. Upon determining the number, the operator gives the caller the number. Current systems now automate the announcement of the number by having the TOPS connect the caller to an announcement system, which synthesizes or plays a voice announcement of the number.

The next significant advance automated the operator's request for the listing and locality from the caller by providing a synthesized or recorded listing and locality request. The caller's response is recorded and automatically played to the next available operator, who queries the database for the proper listing. This automation technique is referred to as "store and forward." The store and forward technique is currently used in directory assistance automation.

The next phase of automation incorporated speech recognition into automated directory assistance systems to identify numbers for frequently requested listings (FRLs) in a given locality without any interaction from an operator. Unfortunately, these systems have not been commercially accepted for several reasons. The percentage of directory assistance calls that existing systems have been able to fully automate is low. Further, the cost and time required to develop and implement such systems is prohibitive given the low percentage of automation.

In operation, directory assistance systems facilitate access to one or more directory assistance databases containing listings for any number of localities. Historically, when an operator handles a call, the operator will develop the database query, initiate the database search, and parse through the returned listings to find the number requested. The operator will signal the TOPS to connect the caller to the announcement system, which will announce the requested number.

When the call is fully automated to the exclusion of the operator, current directory assistance systems attempt to recognize the requested listing and locality and search a special database containing a predefined listing of the most frequently requested numbers. This database that is separate from the primary directory assist database has proven to be very costly to initially create and to subsequently maintain.

In essence, statistical data is gathered from the primary directory assistance database to determine the most frequently requested listings. Once the most frequently requested listings are identified, each listing is associated with a particular locality and number. The rigidity of this association precludes efficient updating, and more importantly, prevents intermingling frequently requested listings and localities for voice recognition. Further, the automation can only occur for previously defined listings incorporated into the special directory assistance database. Less than five percent of calls are automated in the few systems in operation.

Large department stores, such as Kmart or Wal-Mart are typically some of the most frequently requested listings and highlight the deficiencies of the current systems. Assume that the most frequently requested listings are gathered for North Carolina and that there are approximately 100 Kmarts in North Carolina. Statistically, the most frequently requested Kmart listings are those in the more metropolitan areas. As such, although there are 100 Kmarts in North Carolina, only 10 may be within the top 2000 most frequently requested listings. The remaining Kmart listings are not listed in the special directory assistance database and will not be automated, even though the speech recognition system could theoretically recognize the name Kmart and likely synonyms, such as Super Kmart or Big K. Automation is prohibited for new Kmarts until the special directory assistance database is updated and the listing makes its way into the top 2000 most frequently requested listings. Moreover, frequently requested Kmarts that close, move or change numbers are not considered until the special directory assistance database is updated.

These limitations to directory assistance automation continue to render commercial embodiments impractical. Thus, there is a need for a more efficient directory assistance automation overcoming the deficiencies of existing systems.

SUMMARY OF THE INVENTION

The present invention enhances directory assistance automation by searching traditional directory assistance databases with independent listing and locality queries. Initially, a caller's speech responses from a directory assistance inquiry are individually converted to independent listing and locality search queries. The listing and locality queries are determined by processing the caller's speech responses using a defined speech recognition grammar. The listing and locality queries are used to search a directory assistance database. Once the listing results are returned from the directory assistance database, the records in the listing results are analyzed to select a number for the caller's directory assistance request.

If there are multiple records returned, they are preferably processed as follows. If an exact caller-specified locality appears for any number, all other records are discarded. If an expected frequently requested listing number is present, all other records are discarded. When the same locality and listing have a local and a toll-free (800/888) number, the toll-free number is selected and the records having the local number are discarded. When the same name and number appears in multiple communities, the records are combined. If the results have less than a predefined number of records remaining, the caller is given the option to choose the desired listing. Otherwise, the request is transferred to a directory assistance operator. During any of the above steps, once a single record or number within records remains, the number for the remaining record is announced to the caller.

The grammar for listings may be derived from the most frequently requested listings and localities in the directory assistance database. Preferably, the grammar for listings is derived independently of locality information to maximize the listing recognition, and vice versa. The grammar may be created by 1) identifying the most frequently requested localities independent of the listing; 2) grouping synonymous localities within the most frequently requested localities; and 3) determining a common vocabulary for a group of synonymous listings to define a locality grammar. When a requested locality matches any locality in the group of synonymous localities, the locality grammar is used to generate a locality query used to search the directory assistance database.

Preferably, a central directory assistance system is configured to interact with a speech recognition system. In operation, the speech responses are provided to the speech recognition system, which processes the listing and locality responses and returns listing and locality information, preferably in the form a grammar tag. The grammar tag contains the listing and locality information. Other advantages of the present invention will become apparent to those skilled in the art from the following description wherein there is shown and described preferred embodiments of this invention. As will be realized, the invention is capable of other different aspects, all without departing from the invention. Accordingly, the drawings and description will be regarded as illustrative in nature and not as restrictive.

BRIEF DESCRIPTION OF THE DRAWING FIGURES

The accompanying drawings incorporated in and forming a part of the specification illustrate several aspects of the present invention, and together with the description serve to explain the principals of the present invention.

DETAILED DESCRIPTION OF THE PREFERRED EMBODIMENTS

The present invention provides enhanced directory assistance automation and is described in detail below. Upon reading the following description in light of the accompanying drawing figures, those skilled in the art will understand the concepts of the invention and will recognize applications of these concepts not particularly addressed herein. It should be understood that these concepts and applications fall within scope of this disclosure and the accompanying claims. The embodiments set forth below represent the necessary information to enable those skilled in the art to practice the invention and point out the best mode of practicing the invention.

Figure 1:
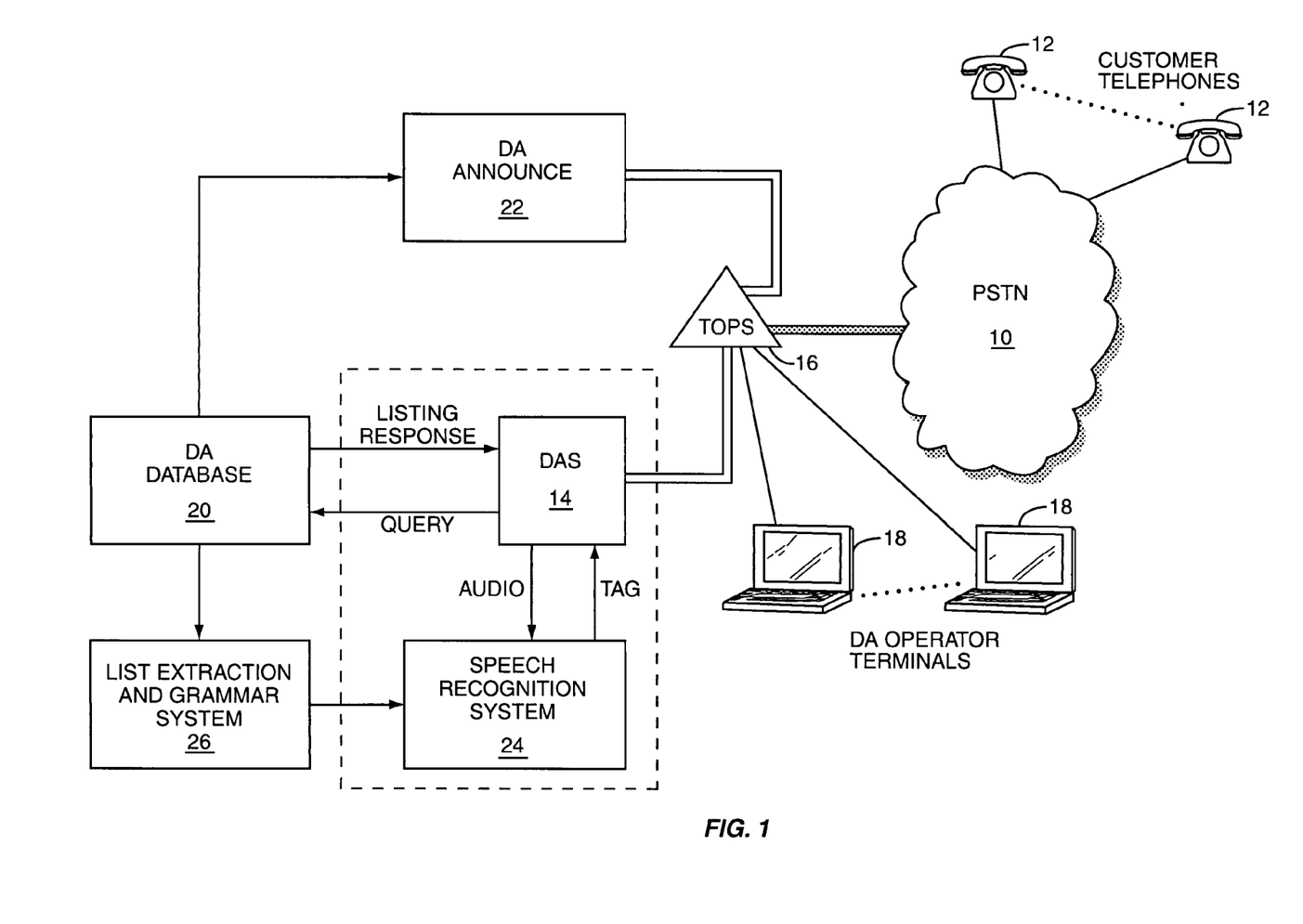
FIG. 1 is representation of a directory assistance network according to the present invention.

FIG. 1 shows a network capable of providing the enhanced automated directory assistance of the present invention. The public switched telephone network (PSTN) 10 makes up the core of the network and provides callers associated with telephones 12 access to a directory assistance system (DAS) 14. Although described in conjunction with PSTN 10, the invention is equally applicable to wireless or internet telephony directory assistance. Callers are connected to the DAS 14 via the Total Operator Position Switch (TOPS) 16. The TOPS 16 is typically dedicated to directory assistance and may route connections for directory assistance calls from the telephones 12 to the DAS 14, to operator terminals 18, or to the announcement system 22 as necessary.

In general, the DAS 14 initially processes the directory assistance call and either routes or processes the call as necessary to provide a number corresponding to a requested listing and locality. Calls that cannot be automated are routed to the next available operator at an operator terminal 18, while the DAS 14 processes calls that can be automated. Regardless of whether the DAS 14 or an operator is responsible for directory assistance, a query for a listing and locality is ultimately determined by the DAS 14 or operator based on the caller's request and sent to a directory assistance database (DAD) 20. The directory assistance database searches listings based on the query and responds with a number or list of numbers for the requested listing. If there is a list of numbers, either the operator (un-automated) or DAS 14 (automated) will analyze the list and select a number to provide to the caller. Once the number is determined, the directory assistance database 20 is instructed to send the number to an announcement system 22. Concurrently, the TOPS 16 is instructed to connect the caller to the announcement system 22, which will audibly announce the selected number to the caller.

Figure 2:
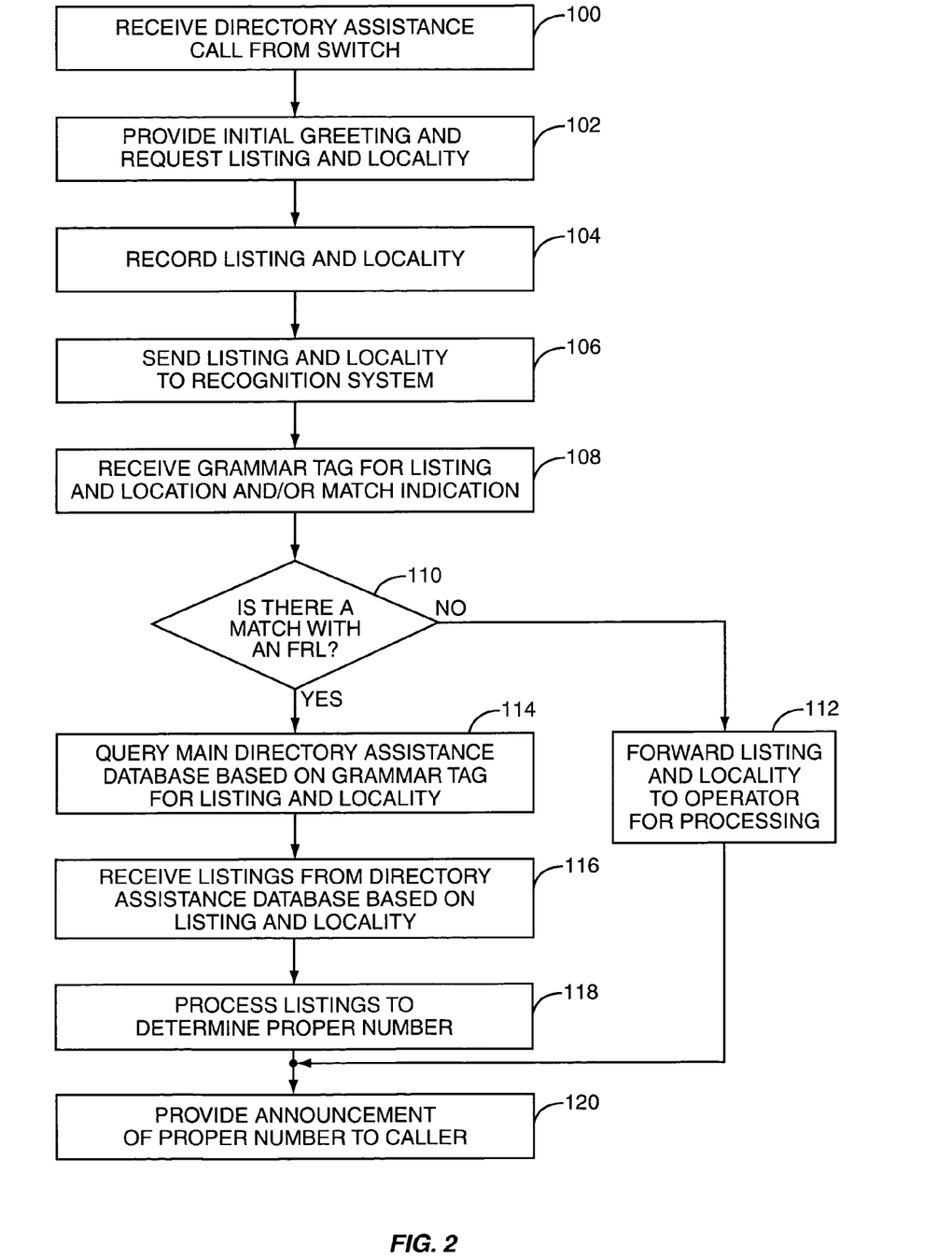
FIG. 2 is a flow diagram outlining preferred directory assistance processing.

The DAS 14 provides the primary control for directory assistance automation, and the operation of DAS 14 is outlined in FIG. 2 in conjunction with FIG. 1. As noted, directory assistance is initiated upon routing a directory assistance call to the DAS 14 using the TOPS 16 (block 100). The DAS 14 will provide the initial greeting such as, "Welcome to Bell East" followed by a request for the desired listing and locality (block 102). The DAS 14 records the response for the listing and the response for the locality provided by the caller (block 104). Notably, the listing and locality requests and listing and locality recordings are typically made individually. For example, the preferable order is to request a listing; record the caller's listing response; request a locality; and record the caller's locality response.

The DAS 14 will then submit the listing response and locality response to a speech recognition system 24 (block 106). The speech recognition system 24 processes the listing response and locality response individually to determine if the listing and locality responses match predefined grammar for directory assistance. Grammar is defined here as words, phrases and rules associated with recognizable speech. Preferably, the grammar for the speech recognition system will include frequently requested listings and frequently requested localities. Importantly, the frequently requested listings and localities are not linked to one another. As such, the comparison of the listing response with the listing grammar is exclusive of the comparison of the locality response with the locality grammar. The configuration of the speech recognition system 24 and details for the grammar are provided below.

Preferably, the DAS 14 will receive from the speech recognition system 24 either a grammar tag indicating listing and locality matches were found or a message indicating no matches were found (block 108). The grammar tag preferably includes information for searching the directory assistance database 20 and analyzing the results provided thereby. The information is analogous to that an operator would generate upon hearing the listing and locality responses. Additional details for creating the grammar tag and the preferred format for the grammar tag are discussed in detail below.

If the speech recognition system 24 fails to find matches for either of the listing or the locality (block 110), the recorded listing and locality responses are forwarded to the next available operator at one of the operator terminals 18 (block 112). Typically, the operator will listen to the recorded responses, generate a query for the database, and send the query to the directory assistance database 20 to carry out the search. When the search results are received, the operator selects the proper number and initiates a signal to the directory assistance database 20 and directory assistance announcement system 22 to transfer and announce the selected number to the user in traditional fashion (block 120).

If the speech recognition system 24 returns a match for the listing and locality responses (block 110), the DAS 14 processes the returned grammar tag and develops a query for the directory assistance database 20 (block 114). Importantly, the directory assistance database 20 that receives the query is the same one normally used for traditional directory assistance. The query is not sent to a special database having the most frequently requested listings for particular listings in a particular locality. Once the DAS 14 sends the query, the directory assistance database 20 will process the query and select all listings matching the query. The processing of the query by the directory assistance database 20 does not have to be any different than for the processing of queries from operators. Hence, a dynamic search of the primary directory assistance database 20 occurs with each automation.

Upon receipt of the listings from the directory assistance database 20 (block 116), the DAS 14 will process the returned listings to select the listing matching the caller's initial request (block 118). If the database query returns a single listing, the DAS 14 simply initiates the announcement of the number for the returned listing by the announcement system 22 (block 120). If the database query returns multiple listings, the DAS 14 will determine the most likely listing for the caller's request based on analysis rules and the associated grammar tag received from the speech recognition system, as detailed below.

Figure 3:
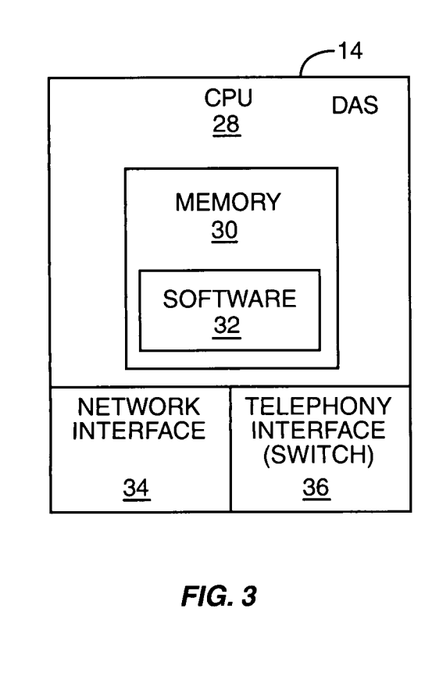
FIG. 3 is a block representation of a directory assistance system according to a preferred embodiment of the present invention.

As shown in FIG. 3, the DAS 14 has a traditional structure including a central processing unit (CPU) 28 having memory 30 with the necessary software 32 to control operation. Typically the CPU 28 is associated with a network interface 34 for communications over a packet-switched network with systems such as the directory assistance database 20 and the speech recognition system 24. A telephony interface 36 is provided to interact with the caller over the telephony connection controlled by the TOPS 16. The CPU 14 will include or be associated with the necessary hardware and software to provide greetings to the caller, ask the caller for desired listing and locality, as well as store and forward the caller's response in traditional fashion. For the present invention, the CPU 28 and software 32 are configured to facilitate directory assistance automation by interacting with the speech recognition system 24 and directory assistance database 20 as described.

Figure 4:
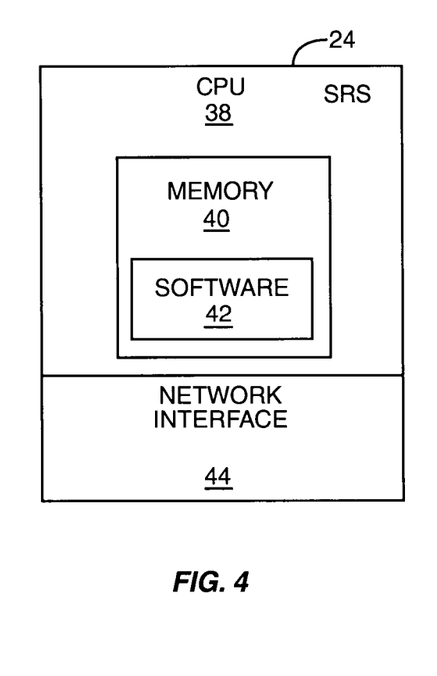
FIG. 4 is a block representation of a speech recognition system according to a preferred embodiment of the present invention.

As depicted in FIG. 4, the speech recognition system (SRS) 24 is preferably configured as a server for the DAS 14 and includes a CPU 38 having memory 40 with software 42 sufficient to control operation. The memory 42 is configured to process locality and listing responses from the caller based on the scripts, rules, and algorithms embodied in the software 42 and provided by the list extraction and grammar system 26 for the frequently requested listings and localities. The speech recognition system 24 has a network interface 44 for interaction with the DAS 14. The audible responses from the caller may be transferred to the speech recognition system 24 from the in a digital format. Further the DAS 14 and speech recognition system 24 may be merged into a single system if desired.

Figure 5:
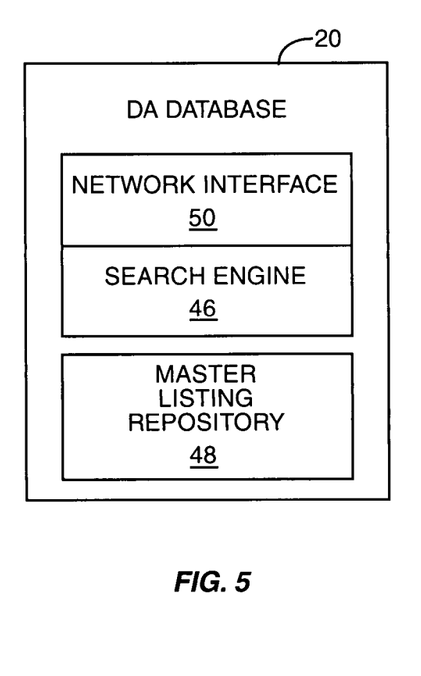
FIG. 5 is a block representation of a directory assistance database.

With reference to FIG. 5, the directory assistance database 20 is of standard configuration and includes the necessary software and hardware to form a search engine 46 for searching a master-listing repository 48 containing the directory listings. Again, the directory assistance database 20 is not dedicated to the inventive automation process. In contrast, the invention strives to search existing directory assistance databases currently in use. The directory assistance database 20 will include a network interface 50 for communicating with the DAS 14 over a packet-switched network.

Prior to providing the described automation, the speech recognition system 24 requires initial configuration. As depicted in FIG. 1, the configuration is based on information received from the directory assistance database 20. The list extraction and grammar system 26 represents the system and process for analyzing the directory assistance database 20 data and providing the initial configuration. Preferably, the list extraction and grammar system 26 will define rules for listing standardization, grammar production, and confirmation prompt production.

Listing standardization is beneficial to optimize automation. A first step in listing standardization is identifying frequently requested listings, regardless of locality, for performing a search of the directory assistance database 20. In other words, the actual company names are searched without limitation by the associated locality, and vice versa. Studies have shown that highly requested listings, such as United Parcel Service, Wal-Mart, and US Airways, have many individual listings throughout many localities. Unfortunately, there are inconsistent spellings and formatting for these listings. To the exclusion of locality, the finding names for the most frequently requested listings are preferably standardized for searching. As such, the directory assistance database 20 may be updated to include a new finding name field to further maximize the number of listings capable of being automated. Since non-residential listings, such as businesses and governments, are most frequently requested, a new field could be modeled after the operators' Business/Government finding field and constructed from the same original finding name fields. Since this newly constructed finding name field is only used for automated searching, cryptic or unobvious names can be used to minimize the length of the finding name and avoid matching names that are not capable of being automated. An example would be to place "U_P_S" in the finding name field, instead of "United Parcel Service."

Another use of the newly constructed finding name field is to use a keyword to identify types of member listings for related captions. A member listing is a number associated with a company, such as a main number, reservations number, or baggage claim number. For example, there are many types of member listings that might be considered as a "main" or "general information" number. The only way to identify these listings is by identifying analogous words or phrases and using conversion rules to insert an identifying keyword into the listing as a finding name. In the "main" number example, the following words and phrases may be used to identify listings considered to be a "main" number: "any number," "home number," "main entrance," "main store," or "main telephone." A conversion rule may replace any occurrence of the listed words or phrases with the keyword "MAIN_SFT," which can be used by the DAS 14 to search the directory assistance database 20 to locate a "general information number." Similar conversion rules are preferable to identify commonly used member listings. Typically, the conversions that occur in the newly constructed finding name field are replacements, not aliases. Those skilled in the art will recognize additional steps for listing standardization.

Figure 6:
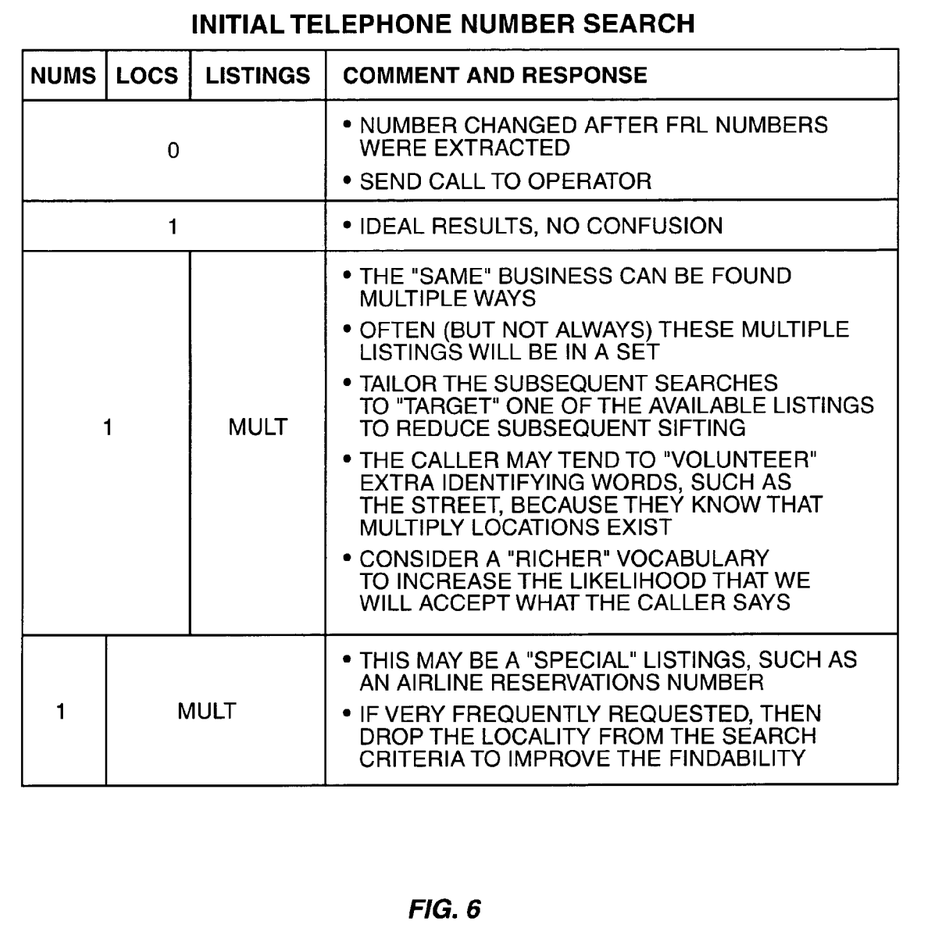
FIG. 6 is a table defining possible results of an initial telephone number search according to the present invention.

As noted, grammar creation is based on frequently requested listings derived from directory assistance statistics for the directory assistance database 20. Preferably, an initial telephone number search of the frequently requested listings is provided to identify the name of the listing corresponding to the specified phone number. The results of the telephone number search indicate there are none, one, or multiple listings associated with a given number as indicated in the table of FIG. 6. If no listings are found, then the supplied number has either been changed or is restricted, either of which means automation is not available. If a single listing and locality is found for a given number, a name is constructed for the listing.

When multiple listings for a given number are returned, additional analysis is necessary. If all of the listings for the number are in the same locality, then all listings are equivalent because they have the same number. As such, the listings vary in configuration and spelling and may require a "richer," or more detailed, grammar to recognize each of the possible variations. Further, the grammar may be configured to associate the various listings to reduce the need for subsequently sifting search results from the DAS 14. If the listings for the given number are spread over multiple localities, the number is likely a regional or national listing, which should not be handled in a local fashion. In this situation, the grammar is configured to ignore locality and provide a national number regardless of locality.

Figure 7:
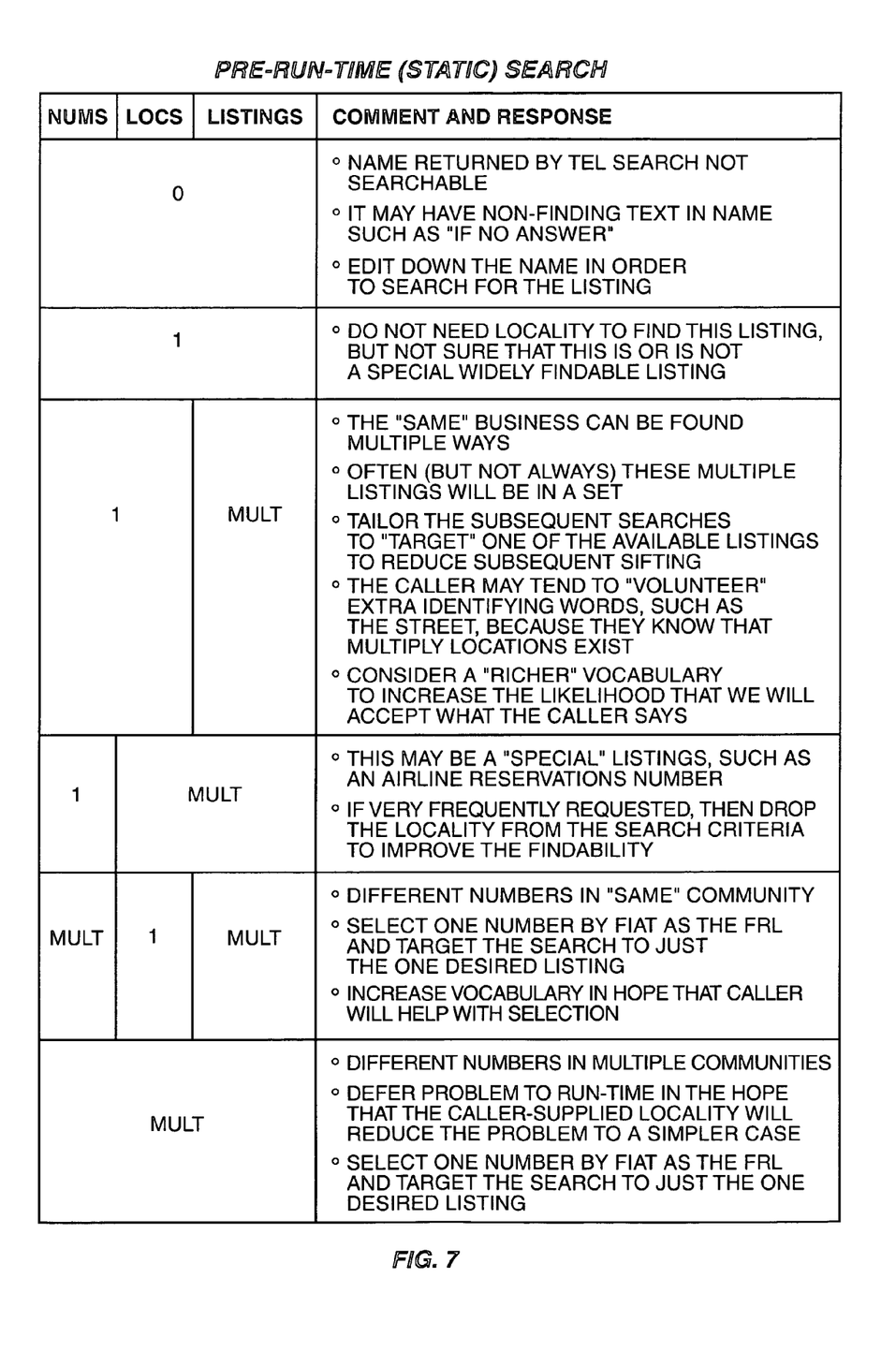
FIG. 7 is a table defining possible results of a pre-run-time search according to the present invention.

Once the initial telephone number search is analyzed, a pre-runtime (static) search of the initial telephone search results is performed. The possible scenarios in the telephone number search results are shown in FIG. 7. The pre-runtime search has three primary purposes. The first is to test whether the listing (name) is searchable by the speech recognition system 24. For example, free format text may not be searchable. If the text is not searchable, words in the text may be edited until the listing can be found.

The second is to identify "special" listings with a common number for many localities without name confusion. Identifying these special listings as regional or national listings in which locality does not matter improves the automation rate of the actual run-time search of the directory assistance database 20 provided by the DAS 14. The third is to discover whether the same listing matches multiple numbers, either in the same community or in different communities. The latter is problematic and typically must be resolved during the run-time search by the DAS 14; however, enhancing the vocabulary for these listings may assist the run-time search. Alternatively, a particular number can be selected as the frequently requested listing by definition.

In the preferred embodiment, grammar creation entails defining a grammar tag based on recognizable responses of the caller. The recognition grammar is a text-based data file that is delivered to the speech recognition system 24 to define what is recognizable. In other words, the recognition grammar defines what a caller will say in response to the query "what listing?" or "what locality?" For each listing to be automated, a grammar tag is created. The grammar tag is a text string, which is returned to the DAS 14 upon recognition of the word or phrase making up the caller's listing request. The grammar tag is used to pass information to the DAS 14 informing it how to search for the listing to automate and how to process the data that will be returned from the directory assistance database 20 as the result of the search.

Preferably, the grammar includes a string of words that make up the spoken vocabulary, such as "Home Depot," that is recognized. The grammar can also contain an alternative vocabulary surrounded by parentheses and separated by vertical bars (|). An example would include "Home Depot (Store|Garden Center)." In this example, the speech recognition system would recognize either "Home Depot Store" or "Home Depot Garden Center." Optional words or phrases may be supported by the grammar and included in the grammar. If optional portions are enclosed in brackets, a grammar tag may take the form "Sears Roebuck [and Company]." In this example, the speech recognition system 24 would recognize either "Sears Roebuck" or "Sears Roebuck and Company."

In practice, the grammar tag includes tag fields, which are preferably text strings of any length and limited to alphanumeric characters and the following characters: dash (—), ampersand (&), single quote ('), and underscore (_). The tag fields in listing automation are used to pass information to the DAS 14 specifying how to retrieve the correct listing for each utterance that is recognized. The information embedded in the tag fields is sent to and processed by the DAS 14 upon successful recognition. Within a grammar tag, tag fields may be separated by the "&" character. Preferably, a three-character tag in the beginning of the tag field identifies the particular tag field. The character tag is made up of two upper-case alphanumeric characters followed by a dash (e.g. "FN-" for a tag for the FINDING NAME tag field). The remainder of the tag field contains variable length data. Periods are used instead of spaces in text strings. The following identifies certain ones of the numerous types of tag fields used in the preferred embodiment of the invention.

The FINDING NAME tag field is identified by "FN-" and is used for listing grammar. The tag field contains multiple words that are to be used as the finding name field for the directory assistance database search.

The LISTING STYLE CODE tag field is identified by "ST-" and is used for listing grammar. The tag field contains information used for tool development and debugging and represents the style code, including the caption header, straight line, etc., of the listings that generated the grammar.

The RECORD ID tag field is identified by "ID-" and is used for both listing and locality grammar. The tag field is also used for tool development and debugging and represents the record identification number for one of the listings that generated the grammar.

The SIFTING KEY tag field is identified by "Sn-" and is used for listing grammar where n is a number zero through nine. The tag field contains one or more words that are used as sifting keys by the DAS 14. These keys may be used for identification of members in a set of numbers to be used for automation once the results are returned from the directory assistance database 20. Sifting is described in greater detail below.

The PRIMARY PROMPT IDENTIFICATION tag field is identified by "P0-" and is used for listing and locality grammar. The tag field contains a text string identifying the primary listing confirmation prompt to be provided or played to the caller. This prompt is usually the only prompt for a straight line listing or header, but may be combined with a secondary prompt for a member listing. For example, a primary prompt may be "US Airways" and may be associated with a secondary prompt "Passenger Reservations."

The SECONDARY PROMPT IDENTIFICATION tag field is identified by "P1-" and is used for listing and locality grammar. The tag field contains a text string identifying the secondary listing confirmation prompt to be provided or played to the caller following a primary prompt. The secondary prompt is typically used only for member listings.

The PRIMARY PROMPT FILE NAME tag field is identified by "X0-" and is used for listing and locality grammar. The tag field contains the file name of the primary listing confirmation prompt. This prompt is typically the only prompt for a straight line listing or header, but may be combined with a secondary prompt for a member listing.

The SECONDARY PROMPT FILE NAME tag field is identified by "X1-" and is used for listing grammar. The tag field contains the file name of the secondary listing prompt and is typically used only for a member listing.

The FILE PLACEMENT tag field is identified by "FP-" and is used for listing and locality grammar. The tag field indicates the type of listing, which is typically Business, Government, or Business Special to direct the DAS 14 on how and where to search for the listings.

The GRAMMAR ID tag field is identified by "GI-" and is used for listing and locality grammar. The tag field contains a unique record identification for the grammar element and is used to assist in keeping the identification record consistent across multiple versions of grammar.

The FRL TELEPHONE NUMBER tag field is identified by "Tn-" (where n is a number from 0 to 99) and is used for listing grammar. The tag field contains a text string for the seven to ten digits representing a number for a frequently requested listing for the associated grammar. This field is used to assist in identifying a listing to be used for automation.

The FINDING STREET tag field is identified by "FS-" and is used in the listing grammar. This field may contain one or more words that are to be used in the finding street field for the directory assistance database search.

The SOURCE tag field is identified by "SR-" and is used in the listing grammar to identify the source of the grammar, either "a" for autogrammar generated through a rules-based software process or "t" for transcriptions of actual calls. This field is informational only, and is not used in the run-time processing of a directory assistance call.

The TRANSCRIPTION COUNT tag field is identified by "TC-" and is used in the listing grammar to indicate the number of times a transcription of this grammar occurred. This field is informational only, and is not used in the run-time processing of a directory assistance call.

The LOCALITY tag field is identified by "FL-" and is used for locality grammar. The tag field contains a text string for the locality name to be used in the directory assistance database search query. The text string is the recognized result corresponding to the "what city" prompt. When used with a listing tag, this locality overrides the recognized locality.

The AREA tag field is identified by "FA-" and is used for locality grammar. The tag field contains a text string of the area name to be used in the directory assistance database search query in conjunction with the LOCALITY tag field. When used in a listing tag, the area overrides the area associated with the recognized locality. The text string is a recognized result corresponding to the "what city" prompt. These tag fields may be used in any number of combinations to form grammar tag for use by the DAS 14. An exemplary tag using the described syntax is as follows:

FN-USAIRWAYS.RESERVATIONS_KW&SR-a&FA-&ST-CM&ID-0200011235&SO-RESERVATIONS_KW&P0-U.S.AIRWAYS&P1-RESERVATIONS&FP-B&GI-x.0200011235.0.0&TO-8004284322&

The mapping of certain frequently requested caption members into general categories, such as "Main" or "General Information Number," is used to facilitate the generation of the speech recognition grammar as well as the processing of the retrieved listing for automation by the DAS 14. For example, many caption sets have a member listing that contains the number of the switchboard, IVR system for incoming calls, or a standard toll-free number used for general access for a particular company. There is no standardization of how the number is listed, nor is there a relationship between the finding name of the member listing and how the caller will ask for the number. For example, a caption for a bank might take the following format:

| First National Bank | (header) |
| South Beach Branch | (member listing) |
| For Toll Free Assistance Dial | (member) |

A caption for a telephone company might take the following format:

| Rochester Power and Gas | (header) |
| For General Information Call | (member) |

In both of the above examples, the member listing in bold is designated the "Main Information" number. If a caller asks for "First National Bank" or "Rochester Power and Gas," the bolded, member listing is automated. Preferably, these classes of listings are identified by keywords within the finding names of the members. These keywords are replaced by a new finding name, such as "MAIN_SFT" in the case of the general information number. In this way, the DAS 14 can directly search for "First National MAIN_SFT" or "Rochester Power Gas MAIN_SFT." Alternatively, "MAIN_SFT" may be specified as a sift key from the SIFT KEY tag field in the grammar tag, and the DAS 14 can look for listings with MAIN_SFT in their finding name and attempt to automate the listing. In addition to the "Main" or "General Information Number," any number of categories, such as "Customer Service," "Reservations or Ticket Office," or "Passenger Information," may be created.

Once the grammar and rules are established, the speech recognition system 24 is ready for operation. The speech recognition system 24 operates to accept a streamed speech input from the DAS 14 for the listing response and the locality response of the caller. Using the loaded grammar and rules, the listing response and the locality response are individually processed to determine vocabulary matches and generate a grammar tag. The grammar tag is returned to the DAS 14 and processed to generate a listing query and a locality query. The queries are sent to the directory assistance database 20 to carry out a run-time search, and a listing response is returned to the DAS 14. Preferably, the listing and locality queries are formed having substantially the same format as those formed by the operator terminals 18 in response to operator commands. This is because the directory assistance database 20 is preferably being used for both operator assisted and automated calls.

Figure 8:
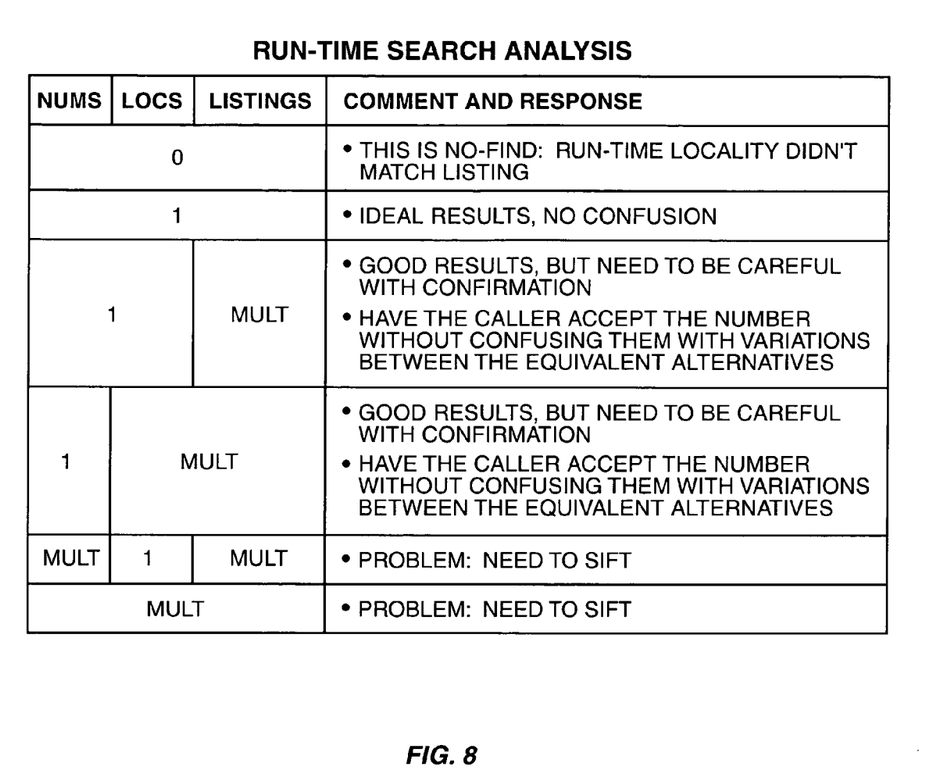
FIG. 8 is a table defining possible results of a run-time search according to the present invention.

The listing response returned from the directory assistance database 20 includes records having a listing and locality with each telephone number. The DAS 14 then provides a run-time search analysis. The likely search results are depicted in the table of FIG. 8. The run-time analysis provided by the DAS 14 is as follows. If no numbers are returned, automation is abandoned, and the search is transferred to an operator. If there is a single number, the number is selected and announced to the caller. If there are multiple numbers in the listing response, the DAS 14 must sift through the returned listings to either select a single number within the listings or transfer the directory assistance request to an operator.

As noted, the SIFTING KEY tag field in the grammar tag provides one or more key words to facilitate the final selection of a number from the listing response. Other tag fields providing expected numbers, localities and listings are also used to eliminate erroneous records and to select the proper number. The overriding sifting rule is to stop sifting once the listing response is narrowed to one number and to initiate announcement of the final number to the caller.

Figure 9A:
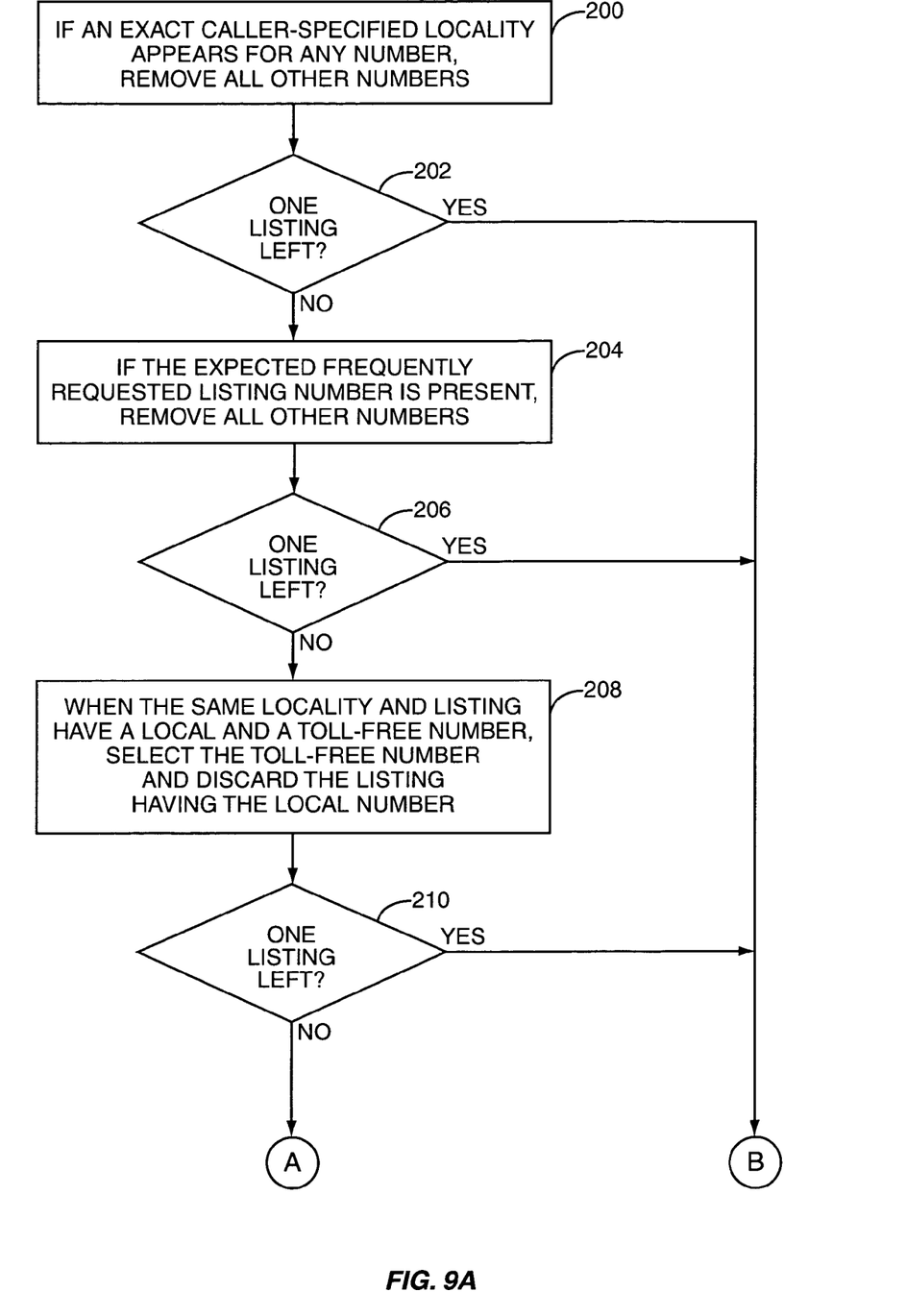
FIGS. 9A and 9B are flow diagrams outlining a sifting process according to the preferred embodiment of the present invention.
Figure 9B:
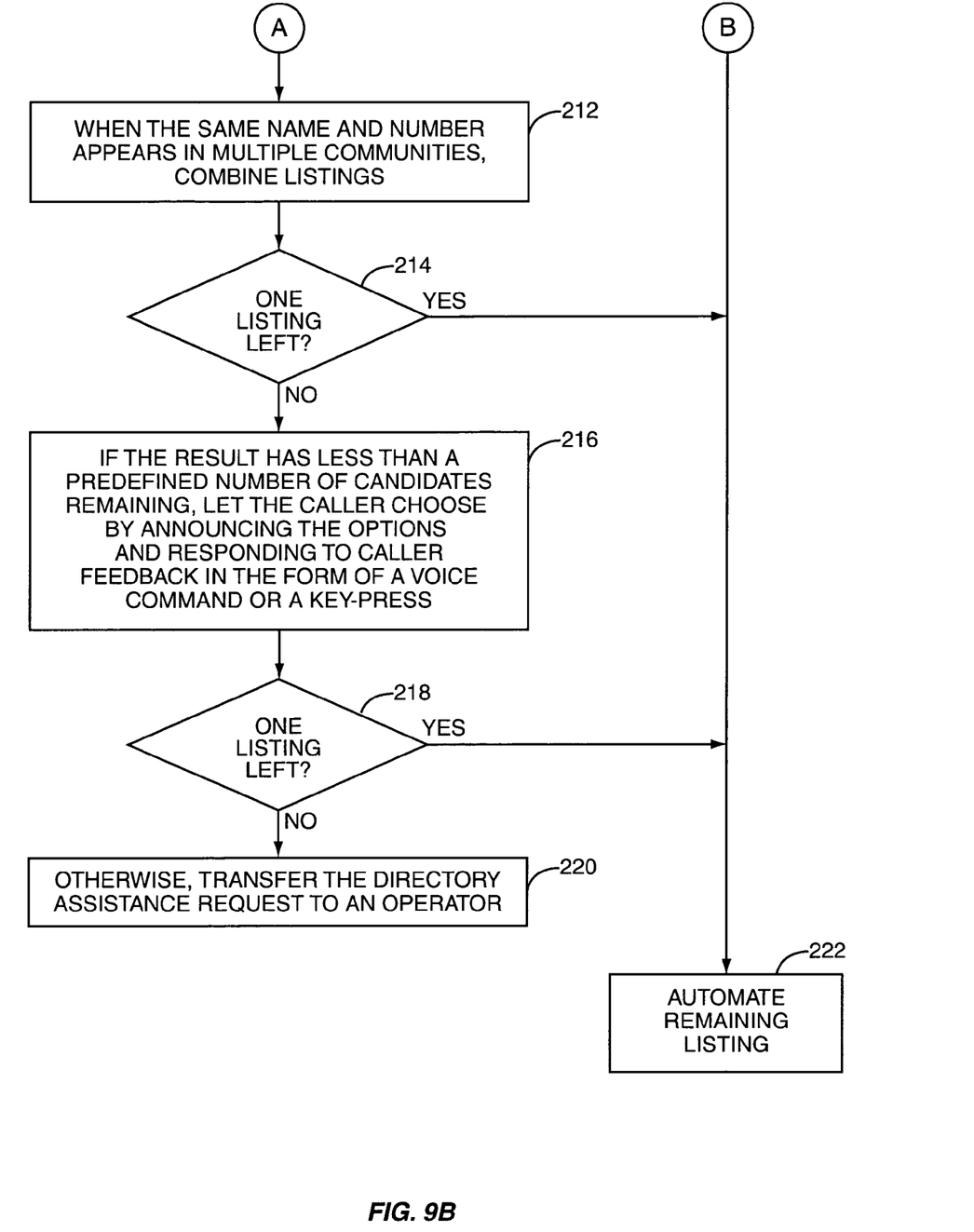

The preferred sifting analysis is outlined in FIGS. 9A and 9B. Between each primary processing step, the DAS 14 will determine if the listings have been paired down to a single listing (blocks 202, 206, 210, 214, and 218). If an exact caller-specified locality appears for any number, the DAS 14 will remove all other numbers (block 200). If the expected frequently requested listing number (derived from the grammar tag) is present, the DAS 14 will remove all other numbers (block 204). When the same locality and listing have a local and a toll-free (e.g. 800/888) number, the DAS 14 will select the toll-free number and discard the listing having the local number (block 208). When the same name and number appear in multiple communities, the DAS 14 will combine the listings (block 212). If the result has less than a predefined number of candidates remaining, the DAS 14 will let the caller choose by announcing the options and responding to caller feedback in the form of a voice command or a key-press (block 216). Otherwise, the DAS 14 will transfer the directory assistance request to an operator (block 220). During any of the above steps, once only a single number is left, the DAS 14 will trigger automation and announcement of the remaining listing (block 222).

For automated directory assistance inquiries, the DAS 14 will preferably provide a confirmation prompt to the caller to ensure the request was properly automated. The confirmation prompt is an announcement to the caller identifying the listing name provided to the caller before announcing the number for the automated listing. The confirmation prompt is preferably based on the listing information sufficient to automate the prompt. For example, if the caller asks for the "Hilton Inn" and the speech recognition system 24 returned that a synonym for "Hilton Inn" is "Hilton Hotel," the confirmation prompt would say, "We found a listing for Hilton Hotel." Although not identical, the confirmation prompt in this particular case should not confuse the caller.

In certain cases, the listing may not contain information that leads to a reasonable, non-confusing confirmation prompt. An example is the listing for "Rochester War Memorial," which has recently been renamed the "Blue Cross Blue Shield Arena." In order to optimize automation of this listing, a recognition grammar is created that contains both "Rochester War Memorial" and "Blue Cross Arena," since most callers will state one of these two names when requesting the listing. The FINDING NAME tag field (FN-) in the grammar tag would contain "Blue.Cross.Blue.Shield" for searching the directory assistance database 20. The related confirmation prompt tag fields in the grammar tag for the listing would differ for the two grammars. In other words, the grammar for the speech recognition system 24 would include information sufficient to return one file name for searching regardless of the listing requested by the caller. Further, given the substantial difference in the old and new listings, the confirmation prompt will reflect what the caller actually said when requesting the listing. Otherwise, the caller may be confused and answer in the negative to the confirmation, thereby erroneously avoiding automation. For confirmation prompts, the user is typically instructed to provide a vocal response or press a certain key to accept or deny the listing.

Although the primary emphasis of the description focuses on the grammar and processing for listings rather than localities, the concepts outlined herein are equally applicable to localities. In practice, localities are less in number, more consistent and more easily defined than listings. The primary automation difficulty associated with locality information is callers requesting the wrong locality or not knowing the exact locality. As such, the grammar for a particular locality may be associated with a larger area or group of localities as defined by the FINDING AREA tag field. Accordingly, the DAS 14 can expand or broaden the directory assistance database 20 search as necessary if no listings or wrong listings are returned. Whether listings or localities, the present invention emulates operator action and allows automation using the existing directory assistance database 20 rather than requiring a special database having frequently requested listings. Further, the unique ability to process and search listings and localities independent of one another greatly expands the number of listings capable of being automated. In addition, automation for a listing does not require preprocessing, especially if the new listing shares a common name, but is located in a different locality.

The foregoing description of preferred embodiments of the invention has been presented for purposes of illustration and description. It is not intended to be exhaustive or to limit the invention to the precise form disclosed. The embodiments were chosen and described in order to best illustrate the principles of the invention and its practical application to thereby enable one of ordinary skill in the art to best utilize the invention in various embodiments and with various modifications as are suited to the particular uses contemplated. It is intended that the scope of the invention be defined by the claims appended hereto.

What is claimed is:

1. A method for automating directory assistance without operator intervention comprising:
   receiving an audible listing response from a caller requesting directory assistance;
   receiving an audible locality response from the caller requesting directory assistance, wherein the locality response identifies a locality and the locality is a geographic location;
   determining a listing query based on the listing response and a locality query based on the locality response, wherein the locality query is not based on the listing response and the listing query is not based on the locality response;
   initiating a search of a directory assistance database using grammar tags provided by a speech recognition system that processes separately the listing and the locality responses;
   receiving a listing response containing at least one record having a listing associated with a number; and
   selecting a record containing a number corresponding to the audible listing response and locality response for announcement to the caller.

2. The method of claim 1 wherein the determining step further comprises determining the listing query based on the listing response using listing grammar derived from most frequently requested listings for the directory assistance database.

3. The method of claim 2 wherein the listing grammar associates a plurality of potential listing responses with a general listing and the determining step further comprises determining that the listing response is one of the plurality of potential listing responses and determining the listing query based on the general listing.

4. The method of claim 2 wherein the determining step further comprises determining the locality query based on the locality response using locality grammar derived from most frequently requested listings for the directory assistance database.

5. The method of claim 1 wherein the locality response is a reply to a "what city" query.

6. The method of claim 2 wherein the most frequently requested listings are not a function of locality.

7. The method of claim 1 wherein the determining step further comprises:
   sending the listing response for grammar processing to determine listing query information;
   sending the locality response for grammar processing to determine locality query information;
   receiving the listing query information and locality query information; and
   deriving the listing query and locality query from the listing query information and locality query information.

8. The method of claim 1 wherein the determining step further comprises:
   sending the listing response for grammar processing to determine listing query information based on most frequently requested listings for the directory assistance database;
   sending the locality response for grammar processing to determine listing query information;
   receiving the listing query information and locality query information; and
   deriving the listing query and locality query from the listing query information and locality query information.

9. The method of claim 1 wherein the determining step further comprises:
   sending the listing response for grammar processing;
   sending the locality response for grammar processing;
   receiving a grammar tag including listing and locality information based on the listing response and the locality response; and
   deriving the listing query and locality query from the grammar tag.

10. The method of claim 1 wherein when the listing response includes a plurality of records, the selecting step further comprising sifting to eliminate ones of the plurality of records until there is one record or a common number throughout any remaining records.

11. The method of claim 10 wherein when at least one of the plurality of records includes a locality matching the caller's locality response and the sifting step further comprises removing all other records in the plurality of records not containing the locality response.

12. The method of claim 10 wherein the determining step further determines an expected number for a frequently requested listing corresponding to the listing response and when at least one of the plurality of records includes the expected number the sifting step further comprises removing all other records in the plurality of records not containing the expected number.

13. The method of claim 12 wherein when certain of the plurality of records contain a given listing and locality the sifting step further comprises removing all records not having a toll-free number if one of the certain records contains the toll-free number.

14. The method of claim 13 wherein when certain of the plurality of records contain a given listing and number the sifting step further comprises combining the certain records into one.

15. The method of claim 14 wherein when the sifting step fails to eliminate ones of the plurality of records until there is one record or a common number throughout any remaining records, transferring the listing response and locality response to an operator.

16. The method of claim 1 further comprising initiating announcement of the selected number to the caller.

17. The method of claim 2 further comprising generating the listing grammar by:
   identifying the most frequently requested listings independent of locality;
   grouping synonymous listings within the most frequently requested listings; and
   determining a common vocabulary for a group of synonymous listings, wherein when a requested listing matches any listing in the group of synonymous listings, the grammar constructed to produce the common vocabulary for generating the listing query used to search the directory assistance database.

18. The method of claim 17 further comprising generating the locality grammar by:
   identifying the most frequently requested localities independent of listing;
   grouping synonymous localities within the most frequently requested localities; and
   determining a common vocabulary for a group of synonymous listings, wherein when a requested locality matches any locality in the group of synonymous localities, the grammar will produce the common vocabulary for generating the locality query used to search the directory assistance database.

19. A method for directory assistance automation comprising:
   requesting a desired listing from a caller;
   requesting a desired locality from the caller, wherein the desired locality corresponds to a geographic location;
   storing a listing response and a locality response from the caller;
   generating a listing search query based on comparing the listing response with most frequently requested listings similar to the listing response, said listing search query independent of the locality response;
   generating a locality search query independent of the listing response and based on the locality response;
   searching a directory assistance database using grammar tags provided by a speech recognition system that processes separately the listing and the locality responses; and
   processing results of the directory assistance database search to select a number corresponding to the listing response and locality response.

20. A system for automated directory assistance automation without operator intervention comprising a control system associated with a telephony line interface and a network interface, said control system adapted to:
   receive an audible listing from a caller requesting directory assistance via said telephony line interface;
   receive a locality response from the caller requesting directory assistance via said telephony line interface, wherein the locality response corresponds to a geographic location;
   determine a listing query based in the listing response and a locality query based on the locality response;
   initiate a search directory assistance database using grammar tags provided by a speech recognition system that processes separately the listing and the locality responses via the network interface;
   receive a listing response containing at least one record having a listing associated with a number via the network interface; and
   select a record containing a number corresponding to the audible listing and locality response for announcement to the caller, wherein the listing and locality searches are substantially independent of one another and directory assistance automation is provided without operator assistance.

21. The system of claim 20 wherein said control system is configured to:
   send the listing response to a speech recognition system to determine listing query information;
   send the locality response to the speech recognition system to determine listing query information;
   receive the listing query information and locality query information from the speech recognition system; and
   derive the listing query and locality query from the listing query information and locality query information.

22. The system of claim 20 wherein said control system is configured to:
   send the listing response to a speech recognition system to determine listing query information based on the most frequently requested listings for the directory assistance database;
   send the locality response to the speech recognition system to determine listing query information;
   receive the listing query information and locality query information from the speech recognition system; and
   derive the listing query and locality query from the listing query information and locality query information.

23. The system of claim 20 wherein said control system is configured to provide speech recognition based on a defined grammar, said control system adapted to:
   process the listing response based on the grammar;
   process the locality response based on the grammar; and
   derive the listing query and locality query.

24. The system of claim 20 further comprising a speech recognition system in communication with said control system, said speech recognition system having a grammar based on most frequently requested listings for the directory assistance database, said control system adapted to:
   send the listing response for grammar processing;
   send the locality response for grammar processing;
   receive a grammar tag including listing and locality information based on the listing response and the locality response; and
   derive the listing query and locality query from the grammar tag, and said speech recognition system adapted to:
   receive the listing response and provide the grammar processing;
   receive the locality response and provide the grammar processing;
   construct the grammar tag based on the grammar processing; and
   send the grammar tag to the control system.

25. The system of claim 20 further comprising a speech recognition system in communication with said control system, said speech recognition system having a grammar based on most frequently requested listings for the directory assistance database, said control system adapted to:
   send the listing response for grammar processing;
   send the locality response for grammar processing;
   receive listing and locality information based on the listing response and the locality response; and
   derive the listing query and locality query from the grammar tag, and said speech recognition system adapted to:
   receive the listing response and provide the grammar processing;
   receive the locality response and provide the grammar processing;
   determine listing and locality information based on the listing response and the locality response using the grammar based on most frequently requested listings; and
   send the listing and locality information to the control system.

26. A system for directory assistance automation comprising:
   means for requesting a desired listing from a caller;
   means for requesting a desired locality from the caller, wherein the desired locality is a geographic location;
   means for storing a listing response and a locality response from the caller;
   means for generating a listing search query based on comparing the listing response with most frequently requested listings similar to the listing response, said listing search query independent of the locality responses;
   means for generating a locality search query independent of the listing response and based on the locality response;
   means for searching a directory assistance database using grammar tags provided by a speech recognition system that processes separately the listing and the locality responses; and
   means for processing results of the directory assistance database search to select a number corresponding to the listing response and locality response.

27. A computer readable medium having software for facilitating automated directory assistance automation without operator intervention and comprising instructions for a computer to:
- process an audible listing response from a caller requesting directory assistance;
- process a locality response from a caller requesting directory assistance, wherein the locality response identifies a geographic location;
- determine a listing query based on the listing response and a locality query based on the locality response;
- initiate a search of a directory assistance database using grammar tags provided by a speech recognition system that processes separately the listing and the locality responses;
- receive a listing response containing at least one record having a listing associated with a number; and
- select a record containing a number corresponding to the audible listing and locality response for announcement to the caller.

28. The computer readable medium of claim 27 further comprising instructions to determine the listing query based on the listing response using listing grammar derived from most frequently requested listings for the directory assistance database.

29. The computer readable medium of claim 28 further comprising instructions to determine the locality query based on the locality response using locality grammar derived from most frequently requested listings for the directory assistance database and wherein the listing query is not based on the locality response and the locality query is not based on the listing response.

30. The computer readable medium of claim 27 further comprising instructions to:
- send the listing response for grammar processing to determine listing query information;
- send the locality response for grammar processing to determine locality query information;
- receive the listing query information and locality query information; and
- derive the listing query and locality query from the listing query information and locality query information.

31. The computer readable medium of claim 27 further comprising instructions to:
- send the listing response for grammar processing to determine listing query information based on most frequently requested listings for the directory assistance database;
- send the locality response for grammar processing to determine listing query information;
- receive the listing query information and locality query information; and
- derive the listing query and locality query from the listing query information and locality query information.

32. The computer readable medium of claim 27 further comprising instructions to:
- send the listing response for grammar processing;
- send the locality response for grammar processing;
- receive a grammar tag including listing and locality information based on the listing response and the locality response; and
- derive the listing query and locality query from the grammar tag.

33. The computer readable medium of claim 27 further comprising instructions wherein when the listing response includes a plurality of records, ones of the plurality of records are eliminated until there is one record or a common number throughout any remaining records.

* * * * *

UNITED STATES PATENT AND TRADEMARK OFFICE
CERTIFICATE OF CORRECTION

PATENT NO. : 6,999,563 B1
DATED : February 14, 2006
INVENTOR(S) : Michael G. Thorpe et al.

It is certified that error appears in the above-identified patent and that said Letters Patent is hereby corrected as shown below:

Column 6,
Line 17, replace "from the in a" with -- from the DAS 14 in a --.

Column 8,
Line 13, replace "tag is. created" with -- tag is created. --.

Column 15,
Line 31, replace "based in the listing" with -- based on the listing --.
Line 33, replace "search directory" with -- search of a directory --.

Column 16,
Line 57, replace "responses;" with -- response; --.

Column 17,
Line 7, replace "from a caller" with -- from the caller --.

Signed and Sealed this

Second Day of May, 2006

JON W. DUDAS
*Director of the United States Patent and Trademark Office*